L. B. HUNT.
Car Wheel.

No. 97,407.

Patented Nov. 30, 1869.

WITNESSES

INVENTOR
Lewis B. Hunt.

United States Patent Office.

LEWIS B. HUNT, OF LEVERETT, MASSACHUSETTS.

Letters Patent No. 97,407, dated November 30, 1869.

IMPROVED RAILROAD-CAR WHEEL.

The Schedule referred to in these Letters Patent and making part of the same

*To all whom it may concern:*

Be it known that I, LEWIS B. HUNT, of Leverett, in the county of Franklin, and State of Massachusetts, have invented a new and useful Improvement in Railroad-Car Wheels; and I do hereby declare the following to be a full, clear, and exact description thereof, which will enable those skilled in the art to make and use the same, reference being had to the accompanying drawing, forming a part of this specification, in which drawing—

Similar letters indicate corresponding parts.

Figure 1:
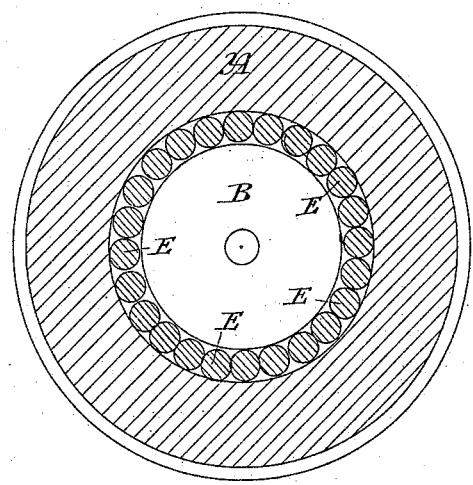
Figure 1 represents a side view of the wheel, one of the semi-hubs being removed.

My invention consists in interposing between the hub, which is fixed to the axle, and the sliding rim arranged on the hub, of a series of independent rubber cylinders, which shall produce a yielding connection between the parts, and which, when the rim drags or slips, will rotate and play in the space in which they are arranged.

The invention further consists in the general combination of certain parts, as will be hereinafter described.

In the example of my invention here shown, the letter A designates the rim of the wheel, having a central opening through it, which, in this illustration, is made circular.

This central opening receives the hub, which is made in two divisions B B, each division being composed of a cylindrical part, C, and a flange, D, the parts C being inserted into the open space of the rim, from opposite sides, and the flanges embracing the sides of the rim, which they overlap, as is shown in the drawing.

The semi-hubs C C do not quite fill the central opening of the rim, and the annular space which is left between them, I fill with an elastic cushion. This cushion can be made in various ways.

Figure 2:
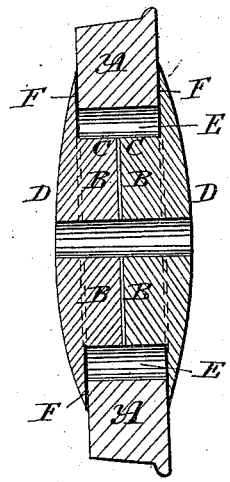
Figure 2 is a vertical section through the axis of the wheel.

One mode of making it is by means of cylinders of India rubber, E, of such a diameter as snugly to fill the annular space, and of a length equal to the thickness of the walls of the rim, as shown in figs. 1 and 2.

Between the flanges D and the sides of the rim A, I interpose a filling or layer of India rubber, F, or other suitable material, to make elastic joints at those places, and thereby prevent noise and injury to the parts from the ordinary wear of the wheel, and from shocks.

The semi-hubs or divisions B B are firmly bolted together, and their flanges embrace the rim A, so as to hold the three parts together, that is to say, the rim A and the divisions B B, and thereby form the wheel.

When cars are passing around curves, it is important that the wheels on one side should slip, or be independent of those on the opposite side, so that there is less friction between the wheels and tracks, and, consequently, less opportunity for breakage of the flanges, and less liability of the cars to run off the track.

It will be observed that the rim A is only held to the hub by the flanges D D of the latter, and, consequently, it is possible for the rim to slip on the hub, when, for example, the brakes are put on the wheel, while under good headway, or in passing around curves, for the purpose stated above.

I do not confine myself to any particular shape of rim, as the shape or form may be varied, as desired.

What I claim as new, and desire to secure by Letters Patent, is—

1. The combination, with the hub D, fixed to the axle, and a sliding rim, A, of the series of independent elastic cylinders, arranged in the space between said two parts, and operating as herein described.

2. A wheel, consisting of two similar flanged cylinders B C D, connected together, and firmly keyed to the axle, in combination with the sliding rim A, having a space between them, receiving the elastic cylindrical packing E, and with the packing F interposed between the flanges of the hub and the sides of the rim, the whole operating together as and for the purpose herein described.

LEWIS B. HUNT.

Witnesses:
W. HAUFF,
E. F. KASTENHUBER.